Patented Aug. 17, 1948

2,447,449

UNITED STATES PATENT OFFICE 2,447,449

PHOSPHOR MATERIAL

Ferd E. Williams, Princeton, N. J., assignor to Radio Corporation of America, a corporation of Delaware Application October 24, 1945, Serial No. 624,255

2 Claims. (Cl. 252—301.6)

This invention relates to phosphor materials for instrument panels of airplanes and many other uses.

In my application, filed October 17, 1945, Serial No. 622,824, I have disclosed a phosphor adapted to emit red light with increased efficiency under ultra-violet and blue light excitation. The compound disclosed therein is manganese-activated magnesium germanate in which the magnesium oxide is present in greater than ortho proportions, which latter connotes two moles of magnesium oxide to one mole of germanium oxide. The magnesium oxide can be varied from two to twenty times that of the magnesium orthogermanate with a maximum increase in efficiency of 600% at the proportions $4MgO.GeO_2:Mn$. In that application it is disclosed that zinc oxide can be substituted in whole or in part for the magnesium oxide, but this is not claimed therein and is the subject of this invention.

It is an object of this invention to improve the visual efficiency of magnesium germanate phosphors by substituting up to 40 mole per cent of zinc oxide for the magnesium oxide of my said application.

Another object is to shift the spectral distribution so as to increase the peak of light intensity nearest the more visible regions of the spectrum, which is around 5600 Å.

Other objects will appear in the following specification, reference being had to the drawing, in which.

It is known that the human eye is most sensitive to light in the neighborhood of 5600 Å. wave length and any shift of intensity of the luminescence toward that wave length in the magnesium germanate phosphors is a useful improvement.

In my experiments to bring about a shift in the desired direction, I have found that substituting zinc oxide is admirably suited for the purpose. The zinc oxide may be substituted up to about 25% for the phosphor having the composition $4MgO.GeO_2:.01Mn$ of my said application. For example, a 25 mole per cent substitution would produce a phosphor having the composition $$3MgO:ZnO:GeO_2:.01Mn$$

Proportions even up to 40 mole per cent substitution of zinc oxide may be made, but the luminescence becomes predominantly yellow.

Figure 1:
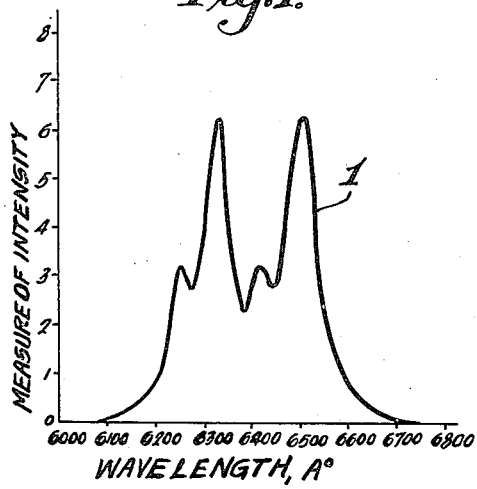
Fig. 1 is a graph of relative intensity vs. wave length for the phosphor of my said application, $4MgO:GeO_2:.01Mn$.

In Fig. 1 of the drawing, the curve 1 has two peaks of about equal value, one being around 6330 Å. and the other 6510 Å., the character Å. denoting angstroms. Substitution of 7½ mole per cent of zinc oxide for the magnesium oxide gives a phosphor having the composition $$3.7MgO:.3ZnO:GeO_2:.01Mn$$

Figure 2:
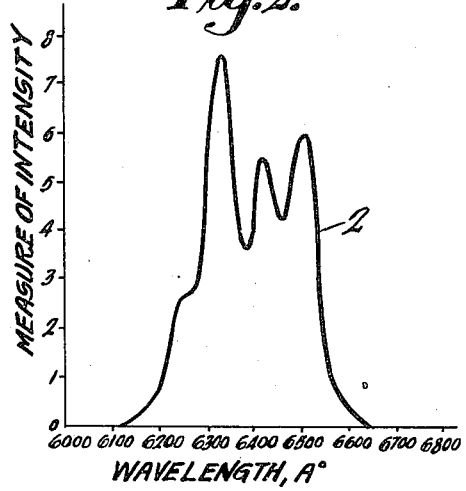
Fig. 2 is a graph of relative intensity vs. wave length for my improved phosphor having the composition $3.7MgO:.3ZnO:GeO_2:.01Mn$.
Figure 3:
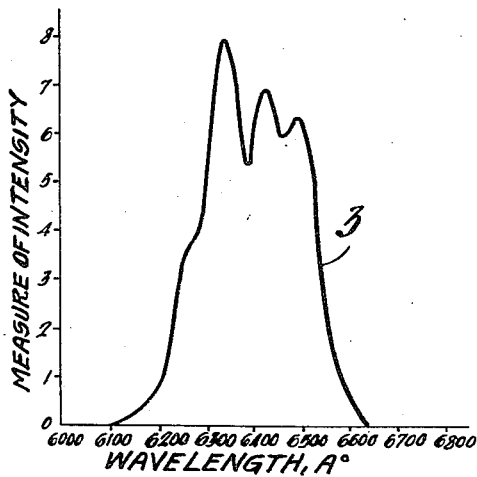
Fig. 3 is a similar graph for a phosphor composition $3.5MgO:.5ZnO:GeO:.01Mn$.

The relative luminescence in the wave length scale of a phosphor of this composition is shown at 2 in Fig. 2. It will be seen that the luminescence in the region where the eye is most sensitive has increased in intensity. The peak at 6330 now predominates. When the proportion of the zinc oxide substituted for magnesium oxide is increased to 12½ mole per cent to form a phosphor having the composition $$3.5MgO:.5ZnO:GeO_2:.01Mn$$

the luminescence further changes, as indicated in curve 3 of Fig. 3. This is the preferred proportion. The emission of this phosphor is red exclusively and the emission peak nearest the optimum of visibility is the most intense.

Figure 4:
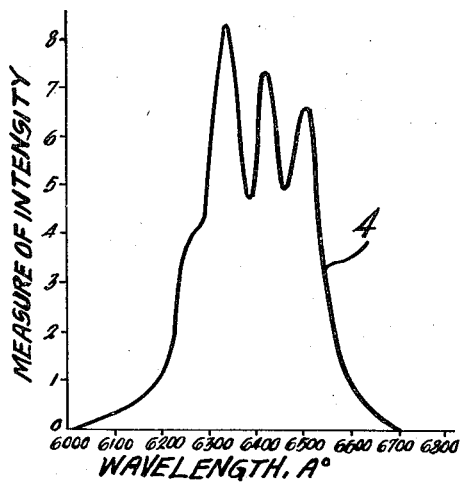
Fig. 4 is a similar graph for a modified form of phosphor having the composition $$2.7MgO:.3ZnO:GeO_2:.01Mn.$$

By using only 3 moles of the oxides of the cations to 1 mole of the basic oxide and making the former 90 mole per cent magnesium oxide and 10 mole per cent zinc oxide, a phosphor having the formula $2.7MgO:.3ZnO:GeO_2:.01Mn$ is obtained with a luminescence characteristic as shown at 4 in Fig. 4 of the drawing.

While I have indicated the manganese activator content as .01 mole in the phosphors, this is by way of example only. This may be varied over a considerable range.

Having described my invention, what I claim is:

1. A phosphor material consisting of the oxides of magnesium, zinc and germanium having the mol formula $V\text{MgO} \cdot X\text{ZnO} \cdot y\text{GeO}_2$, the ratio of V to X being from 3 to 1 up to and including 37 to 3 and the sum of V and X being four times Y and manganese activators in activator proportions.

2. A phosphor material consisting of the oxides of magnesium zinc and germanium and manganese activator having the mol formula $$V\text{MgO} \cdot X\text{ZnO} \cdot y\text{GeO}_2 : Z\text{Mn}$$

the ratio of V to X being from 3 to 1 up to and including 37 to 3, the sum of V and X being four times Y, and Z being substantially 0.01.

FERD E. WILLIAMS.

REFERENCES CITED

The following references are of record in the file of this patent:

UNITED STATES PATENTS

| Number | Name | Date |
|---|---|---|
| 2,066,044 | Leverenz | Dec. 29, 1936 |
| 2,306,270 | Leverenz | Dec. 22, 1942 |